United States Patent
Vermoesen et al.

(10) Patent No.: US 6,679,161 B2
(45) Date of Patent: Jan. 20, 2004

(54) SPACER FOR A VACUUM BRAKE BOOSTER

(75) Inventors: Michel J. Vermoesen, Miamisburg, OH (US); Derek T. Dreischarf, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 53 days.

(21) Appl. No.: 10/015,113

(22) Filed: Dec. 12, 2001

(65) Prior Publication Data

US 2003/0106426 A1 Jun. 12, 2003

(51) Int. Cl.$^7$ ................................................. F15B 21/04
(52) U.S. Cl. .................................................... 91/376 R
(58) Field of Search ................... 92/161, 78; 91/376 R; 60/453

(56) References Cited

U.S. PATENT DOCUMENTS

| | | | |
|---|---|---|---|
| 4,567,728 A | * | 2/1986 | Ohmi et al. ................... 92/168 |
| 4,641,568 A | | 2/1987 | Boehm et al. |
| 4,729,287 A | | 3/1988 | Boehm et al. |
| 4,932,275 A | | 6/1990 | Bischoff et al. |
| 5,011,234 A | | 4/1991 | Bischoff et al. |
| 5,031,507 A | | 7/1991 | Bornemann et al. |
| 5,056,412 A | * | 10/1991 | Gautier et al. ................ 92/161 |
| 6,301,883 B1 | | 10/2001 | Fulks et al. |

* cited by examiner

Primary Examiner—Edward K. Look
Assistant Examiner—Igor Kershteyn
(74) Attorney, Agent, or Firm—Scott A. McBain

(57) ABSTRACT

A spacer for separating a brake booster from a wall comprises a support and a boot. The support is disposed between the booster and the wall, and has a breather port. The boot is integral with the support, and has a generally conical shape tapering from the wall toward a push rod of the booster.

20 Claims, 2 Drawing Sheets

SPACER FOR A VACUUM BRAKE BOOSTER

CROSS REFERENCE TO RELATED APPLICATION

This application is related to U.S. patent application Ser. No. 10/028,239 filed on Dec. 20, 2001 titled "VACUUM BOOSTER AIR INTAKE VIA ENGINE COMPARTMENT BREATHER PASSAGE" by Bernard Petin and Patrick T. Maclellan.

TECHNICAL FIELD OF THE INVENTION

This invention relates to brake systems for vehicles, and more particularly to brake boosters for such systems.

BACKGROUND OF THE INVENTION

A typical brake system for a vehicle includes a brake booster, which is used to amplify the force applied directly to a brake pedal by an operator of the vehicle. The booster is typically mounted outside of the passenger compartment in the engine compartment on a firewall, or dashboard, forming the front wall of the passenger compartment. A push rod extends from the booster through an opening in the front wall for connection with a brake pedal assembly located within the passenger compartment. A flexible boot, or a sliding seal is provided around the push rod for environmentally sealing the hole in the front wall while allowing movement of the push rod by the brake pedal.

The booster is mounted in this fashion because it must draw in and expel a volume of air through a breather port surrounding the push rod, as the brake pedal is depressed and released. This drawing in and expulsion of air through the breather port unavoidably generates noise that would be objectionable to passengers in the vehicle, if the booster were mounted within the passenger compartment. Because the breather port surrounding the push rod is located on the side of the booster closest to the front wall of the passenger compartment, some provision must be made to allow air to flow between the booster and the front wall, in order for the air around the booster to reach the breather port.

In some prior booster mounting arrangements, a mounting adapter is provided between the booster and the front wall of the passenger compartment. The adapter includes a ventilation port open to the engine compartment to provide airflow through the adapter to and from the breather port of the booster. For example, U.S. Pat. No. 4,932,275 provides an adapter that significantly increases the distance the booster protrudes into the engine compartment. In another approach, the housing of the booster on its side adjacent the front wall of the passenger compartment is formed to provide an air channel, such that when the booster is mounted on the wall, air can flow through the channel from the engine compartment to the booster breather port. German patent application DE 195 23 309 A1 discloses this approach.

SUMMARY OF THE INVENTION

The present invention is a spacer for separating a brake booster from a wall. The spacer comprises a support and a boot. The support is disposed between the booster and the wall, and has a breather port. The boot is integral with the support, and has a generally conical shape tapering from the wall toward a push rod of the booster.

Accordingly, it is an object of the present invention to provide a spacer of the type described above that suppresses noise in the passenger compartment during application of the brakes.

Another object of the present invention is to provide a spacer of the type described above in which the boot is integral with the support.

Another object of the present invention is to provide a brake booster, including a spacer of the type described above, that is relatively simple, reliable, light weight and cost effective.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
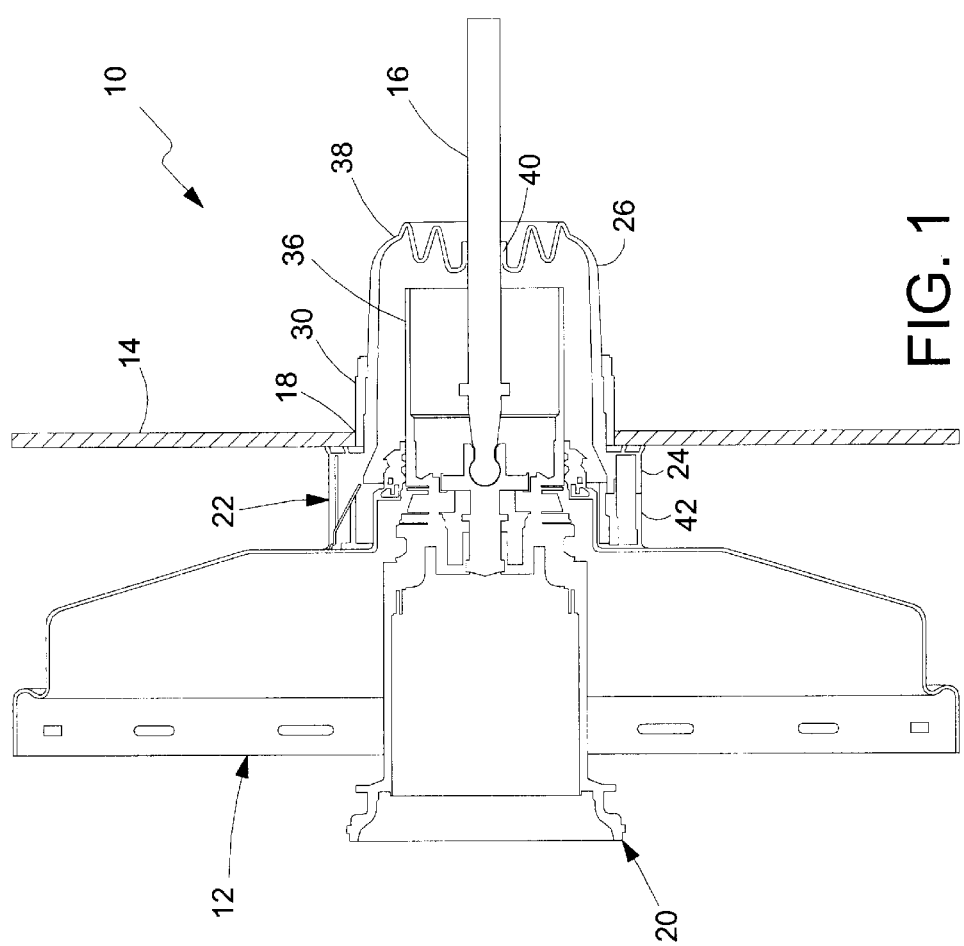
FIG. 1 is a cross-sectional view of a brake booster according to the present invention mounted to a wall.
Figure 2:
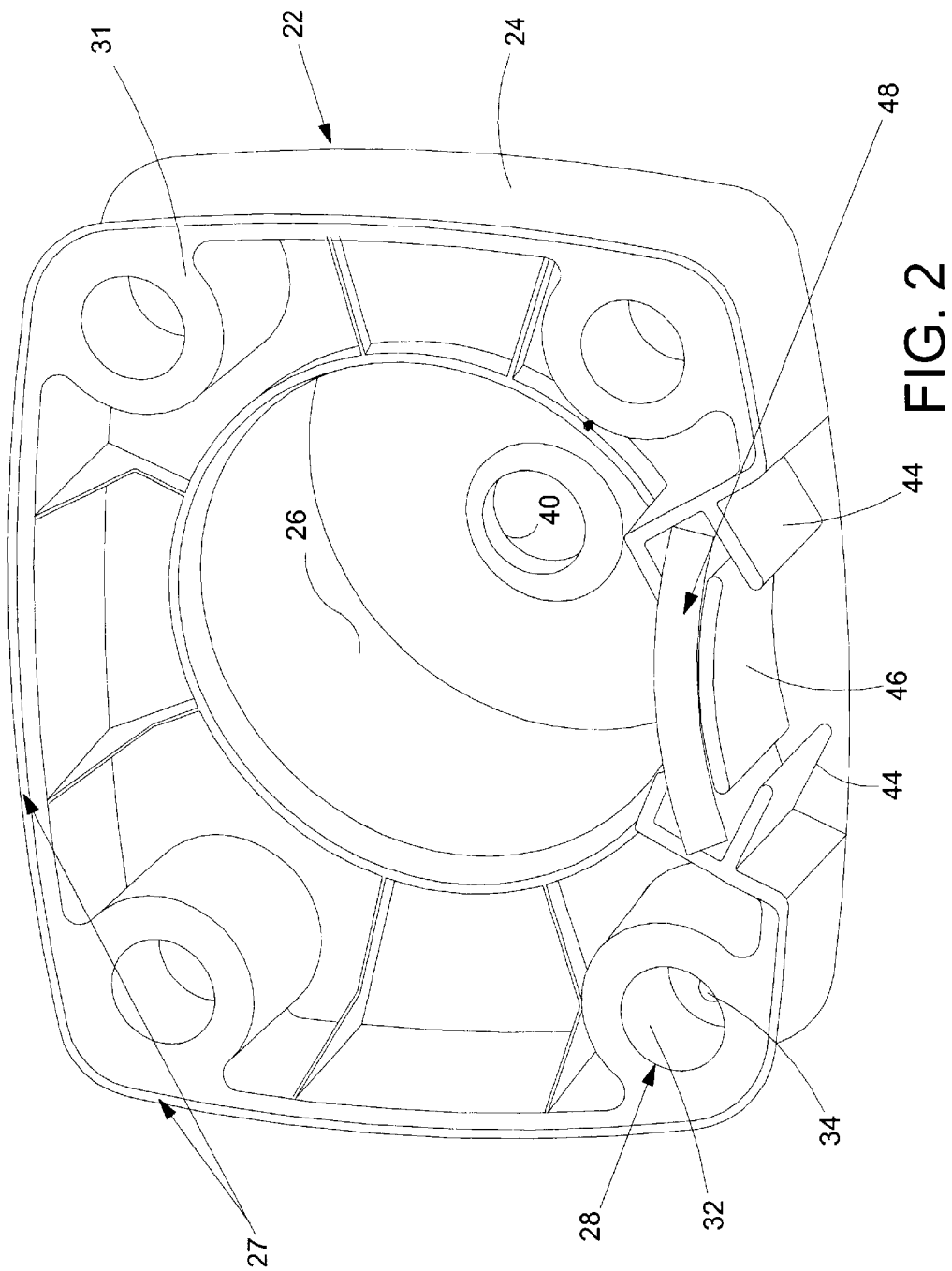
FIG. 2 is a perspective view of a spacer of the brake booster.

FIGS. 1 and 2 show an apparatus 10 for mounting the rear section of a single or tandem brake booster 12 on a dash wall 14 of a motor vehicle. A push rod 16 extends from a passenger compartment of the vehicle, through an opening 18 in the wall 14, and into contact with a piston assembly 20. A spacer 22 is situated in the opening 18, and includes a front portion 24 and a rear portion 26. The spacer 22 is preferably formed from a lightweight, temperature resistant material such as a thermoplastic that is capable of holding its strength and shape when subjected to the long term operating conditions of the vehicle engine compartment.

The front portion or support 24 of the spacer is relatively rigid, and includes a sealing lip 27 for contact with the booster 18. A similar sealing lip is also preferably provided on the rear vertical surface of the support 24 for contact with the wall 14. The support 24 also includes a plurality of bores 28 through which conventional studs or tie rods 30 may extend to trap the spacer securely between the booster 12 and the wall 14. Preferably, contact pads 31 around each of the bores compensate for any irregularities in the surface of the booster 12. Each of the bores 28 may be provided with an overmolded or pressed-in metallic or plastic reinforcing insert 32 with retaining tabs 34 to facilitate this connection. As is apparent, the location of the bores 28 is adaptable to mate with the position of the studs or tie rods of any existing booster. Likewise, the axial width of the support 24 is adaptable to suit any particular application. At least the uppermost horizontal surface of the support 24 is preferably convex in order to facilitate the drainage of water off of the support.

The rear portion or boot 26 is integral with the support 24, and extends through the opening 18 and around a tubular portion 36 of the piston assembly 20. The boot 26 may either be molded with the support 24, or overmolded from a softer material such as an elastomer or another thermoplastic material. The boot 26 has a generally conical shape, including a somewhat wider portion proximate the wall 14 that tapers rearwardly to a flexible bellows 38. It should be appreciated that the outside diameter of the boot 26 proximate the wall 14 is variable to sealingly mate with any existing dash opening 18. The bellows 38 in turn preferably includes a centering bead 40 and a grease pocket that provide a low friction sliding seal with the push rod 16.

The spacer 22 includes a breather port 42. A pair of opposed receptors 44 and a deflector 46 are formed on the front side of the spacer 22, and an air filter 48 is disposed in the receptors 44 and over the deflector 46. When the booster 12 is activated, air is drawn from the engine compartment side of the dash 14 and through the breather port 42. The deflector 46, along with the bottoms of the receptors 44 and the air filter 48, minimizes the intrusion of contaminants such as water and dirt.

The generally conical shape of the boot 26 allows the incoming air to flow around the tubular portion 36 of the piston assembly 20 with minimal turbulence, which decreases the noise associated with the application of power brakes. Furthermore the air filter 48 is separated from the inlet to the tubular portion 36, and the air filter therefore does not need to perform as a noise silencer. As a result, a more porous air filter may be used to achieve better air flow. Because the boot 26 is integral with the support 24, there is a reduction in parts and assembly time in comparison to prior art designs. Moreover, the spacer of the present invention is relatively lightweight, and is effective at dampening vibrations of the brake booster.

While the embodiments of the invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced by the claims.

We claim:

1. A spacer for separating a brake booster from a wall, the spacer comprising:
   a support disposed between the booster and the wall, the support having a breather port and a deflector; and
   a boot integral with the support, the boot having a generally conical shape tapering from the wall toward a push rod of the booster.

2. The spacer of claim 1 wherein the support includes at least one bore.

3. The spacer of claim 1 wherein the support includes at least one bore therethrough adapted to receive a fastener for fastening the booster to the wall.

4. The spacer of claim 2 further comprising an insert disposed in the at least one bore.

5. The spacer of claim 4 wherein the insert includes at least one retaining tab.

6. The spacer of claim 1 wherein the boot includes a centering bead.

7. The spacer of claim 1 wherein the deflector is disposed in the breather port.

8. The spacer of claim 1 further comprising an air filter disposed in the breather port.

9. The spacer of claim 1 wherein the support includes a sealing lip.

10. A brake booster comprising:
    a rear section;
    a support disposed between the rear section and a wall, the support having a breather port and a deflector; and
    a boot integral with the support, the boot having a generally conical shape tapering from the wall toward a push rod of the booster.

11. The brake booster of claim 10 wherein the support includes at least one bore.

12. The brake booster of claim 10 wherein the support includes at least one bore therethrough adapted to receive a fastener for fastening the booster to the wall.

13. The brake booster of claim 11 further comprising an insert disposed in the at least one bore.

14. The brake booster of claim 13 wherein the insert includes at least one retaining tab.

15. The brake booster of claim 10 wherein the boot includes a centering bead.

16. The brake booster of claim 10 wherein the deflector is disposed in the breather port.

17. The brake booster of claim 10 further comprising an air filter disposed in the breather port.

18. The brake booster of claim 10 wherein the support includes a sealing lip.

19. A spacer for separating a brake booster from a wall, the spacer comprising:
    a support disposed between the booster and the wall, the support having a breather port;
    an air filter disposed in the breather port; and
    a boot integral with the support, the boot having a generally conical shape tapering from the wall toward a push rod of the booster.

20. A brake booster comprising:
    a rear section;
    a support disposed between the rear section and a wall, the support having a breather port;
    an air filter disposed in the breather port; and
    a boot integral with the support, the boot having a generally conical shape tapering from the wall toward a push rod of the booster.

* * * * *